United States Patent [19]
Hamilton et al.

[11] Patent Number: 5,328,518
[45] Date of Patent: Jul. 12, 1994

[54] METHOD FOR SEPARATING COMPONENTS OF LIQUIDS IN INDUSTRIAL PROCESS

[75] Inventors: C. Richard Hamilton, Arvada; Eric L. Sweeney, Lakewood, both of Colo.

[73] Assignee: Golden Technologies Company, Inc., Golden, Colo.

[21] Appl. No.: 896,210

[22] Filed: Jun. 10, 1992

Related U.S. Application Data

[63] Continuation-in-part of Ser. No. 849,424, Dec. 6, 1991.

[51] Int. Cl.[5] .................... B08B 3/08; B01D 17/02; C11D 7/24; C23G 5/024
[52] U.S. Cl. .......................... 134/10; 134/26; 134/40; 210/772; 210/799; 252/162; 252/171; 427/353
[58] Field of Search ............... 134/2, 10, 22.14, 22.19, 134/25.4, 26, 40; 252/162, 171, 174.25, DIG. 14; 413/1, 2, 8; 427/327, 353; 210/767, 772, 799

[56] References Cited

U.S. PATENT DOCUMENTS

| | | | |
|---|---|---|---|
| Re. 29,649 | 5/1978 | Farnsworth | 252/171 |
| Re. 32,661 | 5/1988 | Binns | 252/142 |
| 2,711,978 | 6/1955 | Groom | 134/10 |
| 2,923,648 | 2/1960 | K'Burg | 134/12 |
| 3,023,144 | 2/1962 | Greathouse et al. | 167/58 |
| 3,025,190 | 3/1962 | Groom et al. | 134/10 |
| 3,094,469 | 6/1963 | Strauss et al. | 204/141 |
| 3,450,086 | 6/1969 | Maddock | 114/74 |
| 3,548,543 | 12/1970 | Evans et al. | 51/8 |
| 3,634,338 | 1/1972 | Laugle et al. | 252/525 |
| 3,951,682 | 4/1976 | Schevey et al. | 134/102 |
| 3,964,936 | 6/1976 | Das | 148/6.27 |
| 3,969,135 | 7/1976 | King et al. | 134/41 |
| 4,009,115 | 2/1977 | Binns | 252/142 |
| 4,082,867 | 4/1978 | Henley et al. | 427/327 |
| 4,091,954 | 5/1978 | Wallace | 220/470 |
| 4,136,217 | 1/1979 | Henley | 427/327 |
| 4,270,957 | 6/1981 | Donakowski et al. | 134/2 |
| 4,336,152 | 6/1982 | Like et al. | 252/106 |
| 4,362,638 | 12/1982 | Caskey et al. | 252/90 |
| 4,379,168 | 4/1983 | Dotolo | 424/356 |
| 4,414,128 | 11/1983 | Goffinet | 252/111 |
| 4,445,813 | 5/1984 | Misra et al. | 413/1 |
| 4,452,264 | 6/1984 | Kreisel et al. | 134/58 |
| 4,477,290 | 10/1984 | Carroll et al. | 148/6 |
| 4,498,934 | 2/1985 | Potts | 134/254 |
| 4,506,533 | 3/1985 | Hessel et al. | 72/42 |
| 4,511,488 | 4/1985 | Matta | 252/162 |
| 4,537,640 | 8/1985 | Kreisel et al. | 134/18 |
| 4,540,505 | 9/1985 | Frazier | 252/106 |
| 4,599,116 | 7/1986 | King et al. | 134/2 |
| 4,615,744 | 10/1986 | Murtha | 134/25.2 |
| 4,620,937 | 11/1986 | Dellutri | 252/143 |
| 4,640,719 | 2/1987 | Hayes et al. | 134/40 |
| 4,654,089 | 3/1987 | Singelyne t al. | 134/26 |
| 4,661,255 | 4/1987 | Aumann et al. | 210/491 |
| 4,704,225 | 11/1987 | Stoufer | 252/153 |
| 4,749,516 | 6/1988 | Brusky | 252/546 |
| 4,767,563 | 8/1988 | de Buzzaccarini | 252/174 |
| 4,790,951 | 12/1988 | Frieser et al. | 252/162 |
| 4,797,231 | 1/1989 | Schumann et al. | 252/547 |
| 4,798,218 | 1/1989 | Sauvan | 134/74 |
| 4,865,742 | 9/1989 | Falletti | 210/637 |
| 4,966,718 | 10/1990 | Johnson | 210/776 |
| 4,978,506 | 12/1990 | Calderwood | 210/263 X |

FOREIGN PATENT DOCUMENTS

| | | |
|---|---|---|
| 2636149 | 3/1977 | Fed. Rep. of Germany . |
| 2713516 | 9/1978 | Fed. Rep. of Germany . |
| 2026551A | 5/1978 | United Kingdom . |
| 1603047 | 11/1981 | United Kingdom .......... C11D 7/24 |
| 2143254A | 2/1985 | United Kingdom . |

Primary Examiner—Theodore Morris
Assistant Examiner—Saeed T. Chaudhry
Attorney, Agent, or Firm—Sheridan Ross & McItosh

[57] ABSTRACT

Disclosed is a process for separating components of liquids in industrial processes for cleaning of articles. The process is directed toward a terpene-based cleaning system including washing and rinsing of contaminated articles and which further includes separating components of used wash and/or rinse solutions into component parts so that terpene components of the solutions can be recycled for further washing and the water component of the solutions can be purified and recycled for rinsing. The method can include filtering a stream directly from the wash solution to avoid fouling of the filter. The method also includes using a cross flow filter having a pore size of between about 50 Å and about 7,500 Å to effectively separate water from remaining components of the contaminated wash solution.

28 Claims, 1 Drawing Sheet

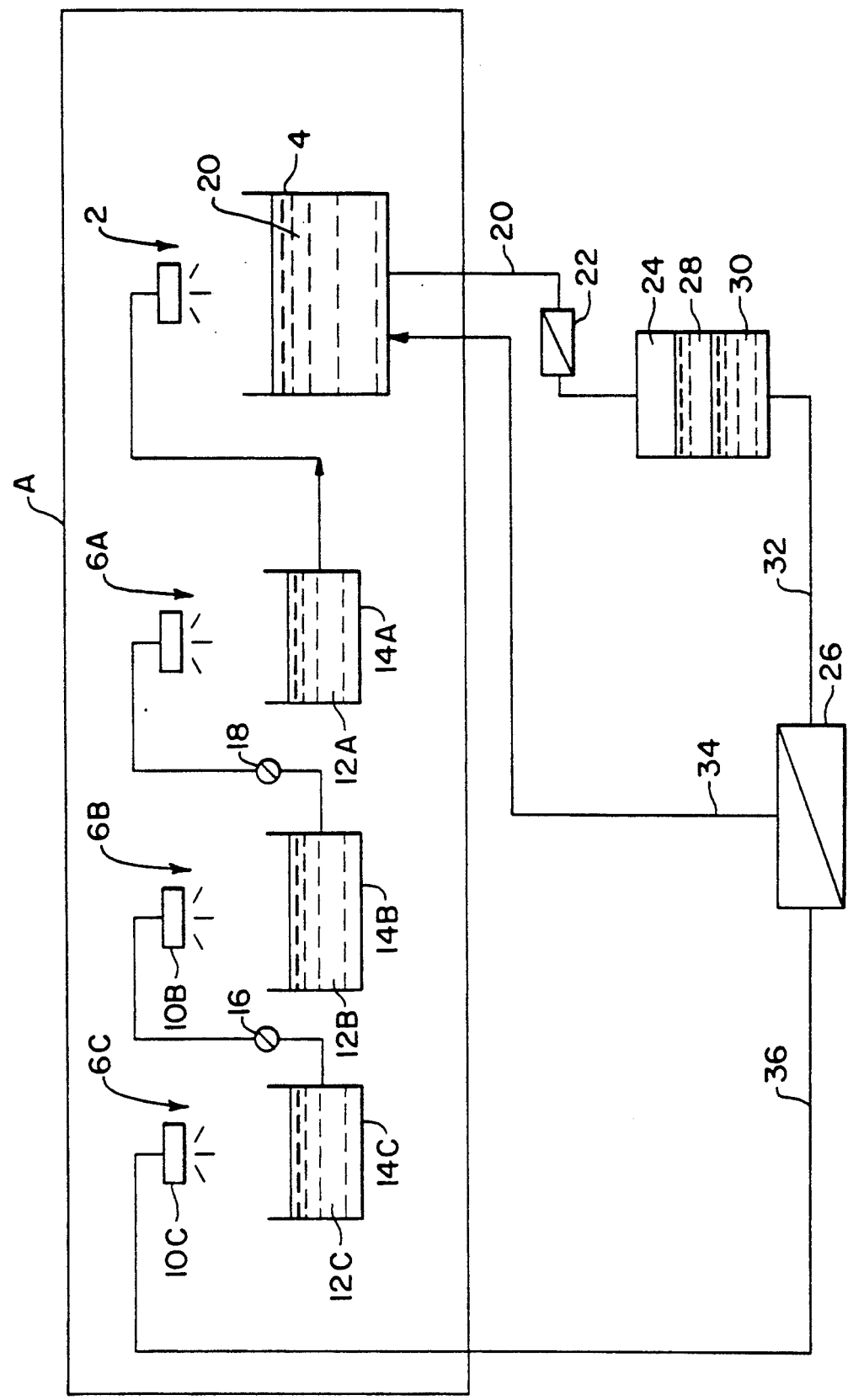

METHOD FOR SEPARATING COMPONENTS OF LIQUIDS IN INDUSTRIAL PROCESS

CROSS REFERENCE TO RELATED APPLICATIONS

This application is a continuation-in-part of co-pending U.S. application Ser. No. 07/849,424 pending which is a national phase of Patent Cooperation Treaty Application Ser. No. US91/09310 filed Dec. 6, 1991 having priority based upon co-pending U.S. application Ser. No. 07/624,140 filed Dec. 7, 1990 now abandoned. All of the preceding patent applications are incorporated herein by reference.

FIELD OF THE INVENTION

The present invention relates to the separation and recycling of components of liquids used in various industrial processes. The invention specifically relates to the separation and recycling of liquids used to remove contaminants, such as lubricants and coolants, from surfaces in the manufacture of various articles, such as aluminum containers.

BACKGROUND OF THE INVENTION

A number of industrial cleaning processes are known. For example, U.S. Pat. No. 4,136,217 (Henley 1979) discloses cleaning oil-in-water emulsions from aluminum cans during their manufacture using an acidic or alkali wash which also includes a de-emulsifier. Henley further discloses separation of the oil washed from the cans and recycling of the entire wash solution with the emulsifier without separation of its components and without recycling of any rinse streams.

U.S. Pat. No. 4,599,116 (King et al. 1986) discloses a process for cleaning aluminum cans which uses an alkaline wash solution for removal of organic soils followed by rinsing with water wherein the rinse water is maintained at neutral or acidic pH to avoid discoloration of cans by alkaline buildup in the rinse water.

A number of references also disclose various cleaning systems which include some type of recycle streams for varied applications. For example, U.S. Pat. No. 3,951,682 (Schevey et al. 1976) discloses a multi-phase rinse and recovery process for cleaning aqueous plating salt-containing solutions from plated articles. The plating salt-containing solution is rinsed with a mixture of two liquids, one of which is not miscible with the plating salt-containing solution. The drained solutions are collected and the immiscible liquid is allowed to separate from the two miscible liquids and the two phases can be recycled.

Other references show the use of terpene-based solutions as cleaning agents. For example, U.S. Pat. No. 4,511,488 (Matta 1985) discloses a d-limonene based aqueous cleaning composition containing between 10 and 60 wt. % d-limonene, between 10 and 30 wt. % surfactants and between 20 and 70 wt. % water for use in cleaning hard and/or flexible substrates, such as surfaces in machine shops, auto service centers, and food processing industries. This reference also discloses that after cleaning, materials such as oils or greases can be allowed to separate from the cleaning solution and that the cleaning solution, including d-limonene, surfactants and water, can be reused without separation of its components and without recycling of any rinse streams.

Another illustrative reference disclosing the use of d-limonene as a cleaner is U.S. Pat. No. 4,640,719 (Hayes et al. 1987) which discloses a method for cleaning solder flux, oils, waxes, greasy substances, and/or adhesive tape residues from printed wiring boards or printed circuit boards.

Despite the large number of references generally dealing with industrial cleaning processes, a need exists for an integrated terpene-based cleaning system which allows for operation in which all liquid cleaning and rinsing streams can be recycled.

SUMMARY OF THE INVENTION

The present invention includes a method for removing water insoluble contaminants from article surfaces and separating and recycling the contaminants and components of the liquids used in the decontamination process. The invention includes various filtration and recycle schemes particularly suited for use in systems for removing contaminants from the surfaces of articles using a terpene-based cleaning composition such as a d-limonene-based composition. The present process generally includes contacting a contaminated article with a wash solution and rinsing the wash solution and contaminants from the article with water. The present process further includes filtering contaminated wash or rinse solutions to separate water from organic components.

In one embodiment of the present invention, the stream to be filtered is taken from the wash solution rather than from the rinse solution. Surprisingly, it has been found in this embodiment that buildup of contaminants on filter walls is avoided and that the water stream produced by the filter is substantially free of terpene.

Another aspect of the present invention is directed to a method for cleaning contaminated articles in which wash and rinse solutions and mixtures thereof are filtered to separate water from any organic components. In this aspect of the invention, the water is reused in the rinse stage and the cleaning agent is reused in the wash stage.

Another aspect of the present invention involves the filtration of the wash and/or rinse solutions in a cross-flow filter. It has been unexpectedly found that cross-flow filters having a pore size of about 500 Å effectively exclude terpene and emulsions. In a preferred embodiment of this aspect of the invention, the filter feed stream has a concentration of contaminants greater than about 2 vol. % and contains contaminants comprising primarily synthetic oils.

The invention also provides a method of initiating operation of a cleaning system for removal of contaminants from an article by introducing an artificial contaminant into the filter feed until the concentration of contaminants in the filter feed stream reaches a threshold level of about 1.5 vol. %. The introduced contaminant is preferably a synthetic oil. The artificial contaminant can be the same contaminant found on the contaminated article or some other similar substance. In this manner, effective filtering is achieved during initial operation of such a system.

BRIEF DESCRIPTION OF THE FIGURES

FIG. 1 is a schematic flow diagram showing the application of wash and rinse solutions and the flow of such solutions and waste solutions therefrom through the washing, rinsing, filtering, and reclaim stages of the present invention.

DETAILED DESCRIPTION OF THE INVENTION

The method of the present invention is suitable for use in a number of industrial processes in which water insoluble contaminants are removed from surfaces. The method is particularly advantageous for use in processes in which water insoluble contaminants, such as various oils, are removed from metal surfaces. For example, co-pending U.S. application Ser. No. 07/849,424 discloses a process for cleaning and preparing metal surfaces for subsequent applications of protective and decorative coatings or other finishes in which the cleaning agent, contaminants and water used in the process are separated and recycled.

The present invention includes various filtration and recycle schemes, such as that set forth in FIG. 1, which are particularly suited for use in systems for cleaning metal surfaces by contacting the metal surface with a terpene cleaning agent. Contaminants, including various oils such as lubricants and coolants, deposited on the surface of the metal during manufacturing processes are effectively removed by contacting the metal surface with a terpene-based wash solution in an amount and concentration sufficient to remove contaminants from the surface. Subsequently, the washed article is contacted with one or more rinse solutions. The resultant mixtures of cleaning agent, contaminants, as well as any water present in the wash and/or rinse solutions, are collected in one or more reservoirs. Portions of the wash and/or rinse solutions which are periodically or continuously removed from the reservoir(s) may be placed in a settling tank where a separation of the contaminants from the cleaning agent and water occurs. The separated cleaning agent and water, and residual amounts of unseparated contaminants, pass from the settling tank, or, if no settling tank is employed, directly from the reservoir(s) through one or more filter steps in which the components in the solution are separated from one another and recycled for use in the cleaning process.

The present invention may be used in various industrial processes to remove water insoluble contaminants from the surface of articles. As used herein, articles refers to any feedstock, goods in process, or finished products of any suitable composition, including without limitation articles composed of metal, plastic, wood, or glass, used or produced during an industrial process. The invention is particularly suited to removing water insoluble contaminants from metal articles such as articles comprising aluminum, steel, brass, copper or alloys thereof. Such articles include, but are not limited to, cars, airplanes, railroad cars, metal components used in high technology industries, computer and calculator face plates, precision metal parts, shiny metal components (e.g. doorknobs), etc. The process is particularly advantageous for removing contaminants from thin metal surfaces. Such thin metal articles are typically less then about 0.010", more preferably less than about 0.0070", and more preferably less than about 0.0040". The process is particularly advantageous for removing contaminants not only from thin metal articles, such as metal foils and sheets, but also from metal articles composed of aluminum, including treated aluminum, tin-free steel, magnesium, including treated magnesium, and copper and copper alloys, because such metals are particularly susceptible to etching problems caused by the use of acidic and caustic cleaning agents. Etching and pitting of an article's surfaces results in increased surface roughness and an increase in the formation of ionization points which attract polar molecules, such as water. Further, the present invention is particularly suitable for cleaning articles which are manufactured by any type of drawing process in which metal starting material is shaped by drawing the metal with various forming parts such as metal dies. Such drawn surfaces are particularly susceptible to etching because they may undergo gouging during the drawing process which can provide a site for etching to occur.

One notable and specific use of the method of the present invention is for cleaning the surfaces of metal containers. The term "container," as used herein, refers but is not limited to, beverage cans, food containers, and other containers such as aerosol cans and oil filters. The term "container" also refers to "two piece" cans, i.e. cans in which the sides and bottom are formed from one piece of metal and the top is the second piece, and to "three piece" cans which are formed from three separate top, bottom and side pieces.

Contaminants refers to any water insoluble organic substance, particularly a petroleum-based or synthetic organic compound, that is deposited on an article's surface during industrial processes. As used herein, water insoluble substances refers to any substance that is not dispersible in water at the molecular or ionic level. Such water insoluble substances are therefore not effectively removed from a surface by water. Contaminants typically will be lubricants and/or coolants, such as forming oils, cutting oils, mill oils, and anti-rust oils, which are commonly composed of petroleum products, esters, diesters and/or fatty acids. Preferred contaminants in the present invention are synthetic in origin including polyglycols, fatty acids, ethers including polyphenyl ethers, and esters including diesters, triesters and tetraesters and including phosphate esters, dibasic acid esters, silicate esters, and neopentyl polyol esters. Contaminants are commonly emulsions of an oil in water, typically having oil concentrations in the range of about 5 vol. % to about 25 vol. %. Metal coil stock for making metal articles, such as containers, for example, is frequently contacted with a number of compositions to lubricate the surface of the metal and to reduce the temperature in the metal.

Preferred contaminants are contaminants having a well-defined lower molecular weight value such that a molecular weight distribution of the contaminants does not go substantially below a given molecular weight. In this manner, effective filtration of system components can be achieved, as discussed below. Thus, preferred contaminants include synthetic oils having a well-defined molecular weight range or petroleum-based oils having a well-defined molecular weight fraction. In a preferred embodiment, the contaminant is an oil with a molecular weight of at least about 300 and more preferably above about 500. In a preferred embodiment of the invention, the contaminant comprises a petroleum fraction having a minimum chain length of 20 carbon atoms, more preferably a minimum chain length of 35 carbon atoms, and more preferably a minimum chain length of 50 carbon atoms. A preferred contaminant includes a tetraester, such as a tetraester formed from the esterification of 10-30 carbon chain saturated fatty acids with pentaerythritol. Such a tetraester is preferably formulated in an amount of about 86 vol. % with about 12 vol. % of surfactants and emulsifiers, and about 2 vol. % of a rust inhibitor.

Contaminants having a low molecular weight or a broad molecular weight distribution including low molecular weight species can pass through the pores in certain filters such as cross-flow filters resulting in poor filtration of water. In contrast, preferred contaminants having a well-defined lower molecular weight value greater than the relevant pore size typically will not pass through the pores in a filter. As used herein, cross-flow filter refers to a device which separates components in a pressurized feed stream moving parallel to a filter membrane. In cross-flow filtration, molecules below a desired size pass through the membrane walls. Molecules above a desired size are substantially incapable of passing through the membrane walls and therefore pass as a filter stream through the filter.

The method of the present invention uses one or more wash solutions typically including water and terpene. The wash solution typically has a substantially neutral pH that effectively removes contaminants from the desired surface. Substantially neutral pH refers to solutions which, given particular concentrations, amounts and cleaning times, do not readily cause detectable etching of an article's surface. Terpenes have the general chemical formula of $C_{10}H_{16}$ and are based on the isoprene unit $C_5H_8$. The term terpene includes terpene derivatives or terpenoids as well as monocyclic, bicyclic, polycyclic or acyclic terpenes. Preferred terpene compositions of the present invention include d-limonene, alpha-terpineol, beta-terpineol, alpha-pinene, beta-pinene, alcohols of such compositions, or mixtures thereof. The concentration of the terpene used depends upon the amount and type of contaminants being removed, the method of application of the wash solution and various other factors. Wash solutions preferably have terpene concentrations ranging from about 1.86 to about 37.2 vol. %, more preferably from about 4.65 to about 27.9 vol. %, and most preferably from about 9.3 to about 23.25 vol. %.

Surfactants are typically included in the wash solution to facilitate rapid wetting of the surface of articles and for emulsification of terpene in water. Surfactants may be added to the wash solution to provide for solubility of the terpene in the water, or they can be separately contacted to the desired surface. Any suitable surfactant or mixtures of surfactants can be used and can be of the non-ionic, anionic, cationic or amphoteric type, and of natural or synthetic origin. Suitable surfactants for use in the present invention include, but are not limited to, nonylphenol, alkanolamide, (nonylphenoxy) polyethylene oxide, sodium salts of petroleum sulfonic acid, sorbitan sesquioleate and mixtures thereof. The concentration of any surfactant used depends upon factors such as the type and strength of the wash solution and the amount of contaminants being removed. The surfactant preferably has a concentration ranging from about 0.14 to about 2.8 vol. %, more preferably from about 0.35 to about 2.1 vol. %, and most preferably from about 0.7 to about 1.75 vol. %. Specific suitable surfactants include surfactants sold under the commercial designation Tergitol NP-7, sold by Union Carbide Corporation, and WRS-1-66, sold by Cyclo-Corporation of Miami, Fla. Tergitol NP-7 is a nonionic nonylphenol with an ethoxylated seven carbon chain and WRS-1-66 includes oleic acid DEA and DEA oleate. Tergitol NP-7 is present in a concentration of about 0.12 to about 2.4 vol. % and WRS-1-66 is present in a concentration of about 0.02 to about 0.4 vol. %.

The relative concentrations of the various components of the wash solution depend upon the factors described above. The ratio of surfactant to terpene is preferably less than about 9.5:90.5, more preferably between about 5:95 and about 8:92, and most preferably about 7:93.

The various aspects of the present invention relate to cleaning systems which generally include contacting contaminated articles with a wash solution and contacting washed articles with rinse solutions to rinse residual wash solution and contaminants from the articles. An illustrative example of such a cleaning system is shown in FIG. 1 in the section marked A and will be described before discussing the various specific embodiments of the invention in detail. Referring to FIG. 1, section A, wash solution 2, in washer reservoir 4, is contacted by any conventional technique with an article (not shown) having contaminants deposited on its surface. Contacting is typically effected by spraying, showering, or immersing of the contaminated article in the wash solution 2. After contacting contaminated articles, wash solution 2, now containing contaminants, is typically drained into or otherwise conducted to washer reservoir 4.

After being conveyed through the washer reservoir 4, the article is then further conveyed through successive rinse stages 6A, B, and C where the article is repeatedly rinsed with water to remove remaining residual wash solution and contaminants. The article is contacted with the rinse water by any conventional technique including spraying, showering, or immersing of the washed article. Any number of rinse stages may be employed depending upon the shape and texture of the article, the amount of wash solution remaining on the article's surface, the manner and duration of rinsing in each rinse stage 6A, B and C, and the desired degree of rinsing. A preferred embodiment of the rinsing process includes three rinsing stages 6A, B and C using plant water and at least one rinse stage (not shown) using clean, deionized water to remove all remaining traces of the wash solution, contaminants, and minerals in the plant water. Articles are rinsed successively by each of the three stages. Rinse water is cycled through the three stages for reuse in prior rinse stages.

For ease of explanation, the following description of the rinsing process begins with the final stage 6C of the rinsing process and subsequently discusses the other two prior rinse stages 6A and B to correspond to the direction of the flow of water in the process, which is opposite to the direction in which articles are conveyed. In the third rinse stage 6C, articles are sprayed with water 8 directed through sprayheads 10C to remove any remaining contaminants and residual wash solution. The rinse water 12C from the third rinse stage 6C is collected in a third stage rinse reservoir 14C. Rinse water 12C in the third stage rinse reservoir 14C may be conveyed by a pump 16 to the sprayhead 10B to be used in the second rinse stage 6B. Likewise, rinse water 12B is taken from the second stage rinse reservoir 14B and conveyed by a pump 18 to the sprayhead 10A to be used in the first rinse stage 6A. Thus, the second rinse stage 6B is supplied with rinse water 12C from the third stage rinse reservoir 14C and the first rinse stage 6A is supplied with rinse water 12B, 12C from both the second 14B and third 14C stage rinse reservoirs. Overflow rinse water 12A from the first stage rinse reservoir 14A may flow either to the washer reservoir 4 for later separation and recycle or directly to the separation and recycle stages described below or to a sprayheader to rinse additional containers rpior to exiting the wash stage.

The combined flow rate of rinse water in the three rinse stages 6A, B and C is sufficient to completely rinse wash solution and contaminants from the article. Preferably, the amount of water used in each stage is kept to a minimum to conserve water while at the same time thoroughly rinsing the article. Between rinse stages 6A, B and C, or after the final rinse 6C, blowers (not shown) can be used to blow residual water from the article. The article can then be subsequently dried in ovens or other conventional drying or heating devices (not shown).

As will be appreciated by those skilled in the art, other techniques may be employed to accomplish the rinsing step. For instance, rinse water may be transported from one rinse stage to another by conventional techniques including, without limitation, gravity flow, pumps, or by arranging the rinse reservoirs 14A, B and C and washer reservoir 4 in a cascading relationship with respect to overflow from one another.

Having generally described the cleaning system involving washing and rinsing steps shown in section A of FIG. 1, a first embodiment of the present invention includes filtering a stream from a washer reservoir (waste stream) such as washer reservoir 4, to separate water from terpene. It has been unexpectedly found that by filtering a washer reservoir stream rather than a rinse reservoir stream, build-up of contaminants in filters can be substantially avoided and the water stream produced by the filter is kept substantially free of terpenes, even though the concentration of contaminants and terpene in a rinse reservoir are typically less than that in a wash reservoir. Without wishing to be bound by theory, it is believed that while the contaminated wash solution has high concentrations of contaminants, it also has the highest concentration of terpene which acts to keep contaminants from building up on filter walls.

The wash solution 2 in the washer reservoir 4 has higher concentrations of wash solution 2 and contaminants removed from the article than rinse water 12A, B and C. The concentration of contaminants in the wash solution 2 varies depending upon a number of factors including the volume of the washer reservoir 4 and the rate of throughput of articles. In typical applications, the contaminant concentration of the wash solution 2 will be greater than a threshold level of above about 0.5 vol. % and more preferably above about 1.5 vol. %, more typically greater than about 1.8 vol. %, and most typically greater than about 2.0 vol. %. The concentration of terpene in the contaminated wash solution is roughly in accordance with the values given above for the wash solution; however, the concentrations will be diluted somewhat by the addition of washed contaminants and optionally, rinse water from the first stage rinse reservoir.

The contaminated wash solution 20 may be directed through a filter 22 to remove solids to a settling tank 24 before filtering in filter 26 or may be filtered by filter 26 directly. In the settling tank 24, the hydrophobic nature of the contaminants 28 makes the components in the contaminated wash solution 20 separate from the aqueous wash solution 30. The efficiency of the separation of contaminants in a settling tank 24 is dependant in large part upon formulation of the wash solution and whether the chemically emulsified terpene and water solution can release contaminants in a relatively short time period. A preferred embodiment of the present process employs the wash solution described above and maximum release of contaminants is achieved in less than about five minutes. It should be recognized, however, that some residual amount of contaminants, such as less than about 2 vol. % based on total volume of the terpene, surfactant, water and residual contaminant solution, more preferably less than about 1.8 vol. %, and more preferably less than about 1.5 vol. %, remains in the wash solution even after maximum separation. The contaminants 28 may be conducted from the settling tank 24 for later reuse or disposal.

The filter can be any suitable filtering device that is capable of separating water from terpene, contaminants and surfactants. In a preferred embodiment, the filter 26 comprises a cross-flow filter capable of letting water pass through its walls, while directing remaining components in the solution through its length. As will be known and understood by those skilled in the art, cross-flow filters may be ceramic, polymer, such as polypropylene, surface treated polypropylene or surface treated polyacrylnitrile in composition. The preferred composition of the cross-flow filter is ceramic. Contaminants may build up on the walls of the ceramic cross-flow filters if too little terpene is present in the filter feed 32. Typically, the minimum concentration of terpene to prevent such buildup is at least about 0.5 vol. %, more preferably at least about 2 vol. %, and more preferably at least about 5 vol. %.

In another embodiment of the present invention, which includes contacting a contaminated article with a wash solution, rinsing the washed article with water, and filtering a stream from the wash and/or rinse solutions into water and terpene containing streams, the filtered water and/or terpene containing streams are recycled, respectively, to the rinse and wash solutions. By recycling not only the terpene in the wash solution but also the water in the rinse and/or wash solutions, the present invention provides for an essentially closed loop system with respect to the components of the rinse and/or wash solutions.

Referring to FIG. 1, after filtration of the filter feed 32, the terpene-containing stream 34 consisting primarily of terpene and surfactant may be reused in the wash solution 20 or disposed of. After filtration, water stream 36 is reintroduced into one or more of the rinsing stages 6A, B, C and/or washer reservoir 4 for reuse and preferably into rinsing stage 6C. Other than the above-described recycle streams, the addition of water to the rinse reservoirs 14A, B and C and/or water, terpene and surfactant to the washer reservoir 4 is only necessary to replenish the losses caused by evaporation, spillage, and adherence of solution to contaminated articles being conveyed through the washing process.

In a further embodiment of the present invention, which includes contacting a contaminated article with a wash solution, rinsing the article with water, and filtering the wash and/or rinse streams, the filter is a cross-flow filter having a pore size ranging from about 50 Å to about 7,500 Å for filtering the rinse solution, wash solution, and/or mixtures thereof, more preferably between about 100 Å and about 5,000 Å, and more preferably between about 200 Å and about 1,000 Å. Although a pore size smaller than about 50 Å may be employed, the filter will have too low a flux rate to be economical. As used herein, flux rate refers to the rate at which a filter separates water from the filtered stream. To attain effective separation of water at a pore size smaller than about 50 Å, either the flow through the cross-flow filter, and therefore the flow rate of solutions used in the cleaning and recycling system, must be reduced or the flow rate of the solutions used in the cleaning and recycling system must be maintained at an effective level by operating a number of cross-flow filters in parallel to effectively separate water from the recycled solution(s). Surprisingly, substantially no terpene passes through a cross-flow filter having a pore size up to the upper pore sizes identified above even though, based solely on the molecular weight of terpenes, it would be expected that terpenes would pass through such pores. While not wishing to be bound by any theory, it appears that the terpene and contaminants in the filter feed interact in such a manner that substantially no terpene passes through the pores in the filter.

In light of the foregoing discussion, filter feed 32 is preferably from washer reservoir 4 and not rinse reservoirs 14A, B and C for the reason that the wash solution 2 and not rinse solutions 12A, B and C has sufficient contaminant and terpene concentrations to substantially prevent the buildup of contaminants on filter walls and/or passage of terpene through the filter walls.

The present invention further includes a method of initiating operation of a cleaning system for removal of contaminants from an article, which system includes washing contaminants from an article with a wash solution, rinsing the washed article with water, and filtering the wash and/or rinse solutions, in which an artificial contaminant is introduced into the filter stream until the concentration of contaminants reaches a threshold level. A threshold level typically refers to a contaminant concentration of between about 0.5 vol. % and about 10 vol. %, more preferably between about 1 vol. % and about 7 vol. %, and more preferably between about 2 vol. % and about 5 vol. %. In this manner, substantially no terpene passes through the pores of the cross-flow filter and contaminates the water used in the rinse apparatus during system start up. The artificial contaminant can be the same contaminant found on the contaminated article or another contaminant, as generally described above, that suitably interacts with the terpene to result in substantially no terpene or artificial contaminant passing through the pores of the cross-flow filter.

One characteristic of the use of a filter in the present invention is the trans membrane pressure (TMP) of the filter. Trans membrane pressure is defined as the inlet pressure plus the outlet pressure divided by two, minus the permeate pressure, if any. Typically, the TMP is between about 5 and about 60, more preferably between about 10 and about 50, and more preferably between about 15 and about 40.

The impact of contaminant concentration in the filter feed stream on the ability of terpene to be separated from water is illustrated by the Examples. As shown in Comparative Example III, substantial amounts of d-limonene pass through a ceramic cross-flow filter having a pore size of about 500 Å when no contaminants are present. As shown in Example I, however, substantially no d-limonene passes through the ceramic cross-flow filter when the filter stream has a concentration of contaminants of 1.5 vol. %.

Referring to FIG. 1, the artificial contaminants are typically added at a point between the washer reservoir 4 and filter 26. The artificial contaminant is introduced into the filter feed 32 until the concentration of contaminants in the filter feed 32 reaches a threshold level. As stated above, the threshold level is typically about 0.5 to about 10 vol. %.

In conjunction with the present invention, a hood, exhaust stack and stack condenser can be placed over the washing and rinsing stages described above to control the amount of volatile organic compounds released during these stages. In a preferred embodiment, terpene emissions can be captured by a hood and condensed by a stack condenser placed within an exhaust stack at a flow rate of about 250 ft$^3$/minute.

The following examples and test results are provided for purposes of illustration and are not intended to limit the scope of the invention.

EXAMPLE I

This example illustrates that by filtering a stream from the washer reservoir rather than the first rinse reservoir a substantially clear water stream is produced for reuse.

A wash solution with 10 vol. % of a mixture of 93 vol. % d-limonene, 6 vol. % Tergitol NP-7 and 1 vol. % WRS-1-66 is prepared. The wash solution is used to remove synthetic ester-based lubricants from aluminum containers. A stream of the contaminated wash solution having about 3 vol. % contaminants is transported to a settling tank where it is allowed to settle for approximately 5 minutes. At the end of this time period, a water insoluble phase including the lubricant forms at the surface of the contaminated wash solution. A stream is taken from the aqueous bottom phase of the settled contaminated wash solution, which contains less than about 1.5 vol. % contaminants. The stream is passed under pressure through a ceramic cross-flow filter having a pore size of 500 Å. The filter produces a clear water stream with no detectable oil odor, containing less than 50 ppm of contaminant, terpene, and surfactant.

COMPARATIVE EXAMPLE II

This example illustrates that, by filtering a stream from the rinse reservoir rather than the wash reservoir, a water stream containing significant amounts of oil, terpene and surfactants is produced.

An experiment is performed using the same system as Example I except that, instead of filtering a stream from the washer reservoir, a stream from a first rinse reservoir is filtered. The cleaning system has three rinse stages. The rinse water flows from the third rinse stage to the second rinse stage and from the second rinse stage to the first rinse stage in a direction opposite to the direction of the movement of the washed containers which are successively rinsed by the rinse stages. The stream from the first rinse reservoir having less than about 0.1 vol. % lubricants is passed through the ceramic cross-flow filter in Example I. The filter produces a water stream that is cloudy and has a terpene-type odor. The water stream contains greater than 200 ppm oil, terpene and surfactant.

COMPARATIVE EXAMPLE III

This example illustrates that the filtering of a wash solution containing less than 1.0% by volume contaminants, such as during initial start-up of a Cleaning system, does not effectively separate water from terpene.

A clean wash solution, as described in Example I, is introduced into a wash reservoir having no lubricants or other contaminants. A stream of the clean wash solution is passed through the ceramic cross-flow filter of Example I during the initiation of operation of the cleaning system. The water stream produced by filter contains substantial amounts of d-limonene.

EXAMPLES IV A-D

A series of experiments were performed to illustrate the ability of a ceramic cross-flow filter to separate water from various compositions of a simulated contaminated wash solution.

Example IV-A

A simulated contaminated wash solution was prepared by mixing 10% by volume of a composition of 93 vol. % d-limonene, 6 vol. % Tergitol NP-7, 1 vol. % WRS-1-66 and 1% by volume Quaker State 990ABB oil with water. Quaker State 990ABB oil is a petroleum derived bodymaker oil having an unknown molecular weight distribution and unknown composition. The simulated contaminated wash solution was passed through a Membralox Ceramic Membrane available from Alcoa Separations Technology, Inc. which is a cross-flow filter with a pore size of 500 Å. The test parameters and results are shown in Table 1 below.

TABLE 1

| | | | | | Water, 10% d-limonene mixture, 1% Quaker 990ABB Oil | | | | | |
|---|---|---|---|---|---|---|---|---|---|---|
| Sample | Flow Rate (GPM) | In-Flow Pressure (psig) | Out-Flow Pressure (psig) | Permeate Pressure (psig) | Permeate Flow (Seconds/ 16 oz) | Permeate (GPM) | TMP Trans Membrane Pressure | Permeate Appearance | Smell | Presence of Terpene |
| 1 | 10 | 14 | 5 | 0 | 211 | .036 | 9.5 | Cloudy | Oily | Yes |
| 2 | 10 | 21 | 11.5 | 0 | 102 | .074 | 16.25 | Cloudy | Oily | Yes |
| 3 | 10 | 33 | 25 | 0 | 88 | .085 | | Cloudy | Oily | Yes |
| 4 | 20 | 36 | 9 | 0 | 59 | .128 | | Cloudy | Oily | Yes |
| 5 | 20 | 45 | 18 | 0 | 42 | .179 | | Cloudy | Oily | Yes |
| 6 | 20 | 55 | 26 | 0 | 33 | .227 | | Cloudy | Oily | Yes |
| 7 | 25 | 52 | 11 | 0 | 36 | .208 | | Cloudy | Oily | Yes |
| 8 | 25 | 60 | 23 | 0 | 27 | .278 | | Cloudy | Oily | Yes |
| 9 | 15 | 25 | 7 | 0 | 70 | .108 | | Cloudy | Oily | Yes |
| 10 | 15 | 33.5 | 16 | 0 | 47 | .159 | | Cloudy | Oily | Yes |
| 11 | 15 | 46 | 29 | 0 | 41 | .183 | | Cloudy | Oily | Yes |
| 12 | 15 | 58 | 40.5 | 0 | 38 | .197 | | Cloudy | Oily | Yes |

As can be seen from Table 1, the use of a petroleum-based oil may cause the filtered water stream to be contaminated by substantial amounts of organic materials, such as oils and terpene, which pass through the filter membrane.

Example IV-B

An additional 0.5% by volume Quaker State 990ABB oil was added to the simulated contaminated wash solution of Example IV-A to produce a total oil concentration of 1.5% by volume. The simulated contaminated wash solution was passed through the same filter as in Example IV-A. The test parameters and results are shown in Table 2 below.

TABLE 2

| | | | | | Water, 10% d-limonene mixture, 1.5% Quaker 990ABB Oil | | | | | |
|---|---|---|---|---|---|---|---|---|---|---|
| Sample | Flow Rate (GPM) | In-Flow Pressure (psig) | Out-Flow Pressure (psig) | Permeate Pressure (psig) | Permeate Flow (Seconds/ 16 oz) | Permeate (GPM) | TMP | Permeate Appearance | Smell | Presence of Terpene |
| 1 | 10 | 14.5 | 5.5 | 0 | 117 | .064 | 10 | Cloudy | Oily | Yes |
| 2 | 15 | 24.5 | 6.5 | 0 | 68 | .110 | 15.5 | Cloudy | Oily | Yes |
| 3 | 18 | 42 | 19 | 0 | 64 | .117 | 24.75 | Cloudy | Oily | Yes |

As can be seen from Table 2, the use of a petroleum-based oil may cause the filtered water stream to be contaminated by substantial amounts of organic materials, such as oils and terpene, which pass through the walls of the filter membrane.

Example IV-C

A synthetic oil composed of 86 vol. % of a tetraester formed from the esterification of 30 carbon chain saturated fatty acids with pentaerythritol, 9.9 vol. % of S-MAZ80, 6.6 vol. % of BRIJ-30, 3.3. vol. % of Mazon 224-86, and 3.3 vol. % of Mazon RI6, was added to the simulated contaminated wash solution of Example IV-B. S-MAZ80, BRIJ-30 and Mazon 224-86 are surfactants available for Mazer Chemical. Mazon RI6 is a rust inhibitor available from Mazer Chemical. The simulated contaminated wash solution was then passed through the same ceramic cross-flow filter as in Example IV-A. The test parameters and results are shown in Table 3 below.

TABLE 3

| | | | | | Water, 10% d-limonene mixture, 1.5% Quaker 990ABB Oil, and 1% Biolube | | | | | |
|---|---|---|---|---|---|---|---|---|---|---|
| Sample | Flow Rate (GPM) | In-Flow Pressure (psig) | Out-Flow Pressure (psig) | Permeate Pressure (psig) | Permeate Flow (Seconds/ 16 oz) | Permeate (GPM) | TMP | Permeate Appearance | Smell | Presence of Terpene |
| 1 | 10 | 16 | 5 | 0 | 122 | .061 | 10.5 | Clear | None | No |
| 2 | 10 | 22 | 12 | 0 | 85 | .088 | 17 | Clear | None | No |
| 3 | 10 | 33 | 23 | 0 | 86 | .087 | 28 | Clear | None | No |
| 4 | 20 | 39 | 8.5 | 0 | 63 | .119 | 23.75 | Clear | None | No |
| 5 | 20 | 47 | 18 | 0 | 41 | .183 | 32.5 | Flock initially present in permeate but permeate | None | No |

TABLE 3-continued

| | | | | | Water, 10% d-limonene mixture, 1.5% Quaker 990ABB Oil, and 1% Biolube | | | | | |
|---|---|---|---|---|---|---|---|---|---|---|
| Sample | Flow Rate (GPM) | In-Flow Pressure (psig) | Out-Flow Pressure (psig) | Permeate Pressure (psig) | Permeate Flow (Seconds/ 16 oz) | Permeate (GPM) | TMP | Permeate Appearance | Smell | Presence of Terpene |
| | | | | | | | | clearer thereafter | | |
| 6 | 20 | 56 | 26 | 0 | 34 | .221 | 41 | Clear | None | No |
| 7 | 25 | 54 | 11 | 0 | 42 | .179 | 32.5 | Clear | None | No |
| 8 | 20 | 40 | 8 | 0 | 56 | .134 | 24 | Clear | None | No |
| 9 | 15 | 27.5 | 6.5 | 0 | 81 | .093 | 17 | Clear | None | No |
| 10 | 10 | 15.5 | 5 | 0 | 192 | .039 | 10.25 | Clear | None | No |

As can be seen from Table 3, the use of a synthetic oil causes the filtered water stream to be substantially free of organic materials.

Example IV-D

An additional 0.5% by volume of the synthetic oil in Example IV-C was added to the simulated contaminated wash solution in Example IV-C to produce a concentration of 1.5% by volume in the simulated contaminated wash solution. The simulated contaminated wash solution was then passed through the same ceramic cross-flow filter as in Example IV-A. The test parameters and results are shown in Table 4 below.

TABLE 4

| | | | | | Water, 10% d-limonene mixture, 1.5% Quaker 990ABB Oil, and 1.5% Biolube | | | | | |
|---|---|---|---|---|---|---|---|---|---|---|
| Sample | Flow Rate (GPM) | In-Flow Pressure (psig) | Out-Flow Pressure (psig) | Permeate Pressure (psig) | Permeate Flow (Seconds/ 16 oz) | Permeate (GPM) | TMP | Permeate Appearance | Smell | Presence of Terpene |
| 1 | 15 | 27 | 7 | 0 | — | | 9.5 | Clear | None | No |
| 2 | 15 | 27 | 7 | 0 | 115 | .065 | 16.25 | Clear | None | No |
| 3 | 15 | 27 | 7 | 0 | 112 | .067 | | Clear | None | No |
| 4 | 15 | 27 | 7 | 0 | 95 | .079 | | Clear | None | No |
| 5 | 15 | 27 | 7 | 0 | 93 | .081 | | Clear | None | No |
| 6 | 16 | 27 | 7 | 0 | 92 | .082 | | Clear | None | No |

As can be seen from Table 4, the use of a synthetic oil causes the filtered water stream to be substantially free of organic materials.

While various embodiments of the present invention have been described in detail, it is apparent that modifications and adaptations of those embodiments will occur to those skilled in the art. However, it is to be expressly understood that such modifications and adaptations are within the scope of the present invention as set forth in the following claims.

What is claimed is:

1. A method for cleaning contaminated articles, comprising:
    (a) contacting a contaminated article, such article made of a material selected from the group consisting of metal, ceramic, fiberglass, plastic and wood, with a first wash solution comprising water and a terpene to produce a first waste solution;
    (b) rinsing said contacted article from step (a) with water;
    (c) filtering a stream from said first waste solution to separate water from said terpene.

2. The method as set forth in claim 1, wherein at least a portion of said rinse water in step (b) is water separated in step (c).

3. The method as set forth in claim 1, wherein at least a portion of said terpene in said first wash solution is terpene separated in step (c).

4. The method as set forth in claim 1, wherein said filter stream in step (c) has a terpene concentration of at least about 0.5 vol. %.

5. The method as set forth in claim 1, wherein at least part of said contaminated article is contaminated with a synthetic contaminant having a molecular weight of at least about 300.

6. The method as set forth in claim 1, wherein said filter stream in step (c) has a concentration of contaminants of greater than about 0.5 vol. %.

7. The method as set forth in claim 1, wherein said terpene is selected from the group comprising d-limonene, alpha-terpineol, beta-terpineol, alpha-pinene, beta-pinene, alcohols thereof and mixtures thereof.

8. The method as set forth in claim 1, further comprising:
    (d) rinsing the rinsed article from step (b) with water to produce a second waste solution; and
    (e) wherein at least part of said water used in step (b) comprises said second waste solution.

9. A method of cleaning contaminated articles, comprising:
    (a) contacting a contaminated article, such article made of a material selected from the group consisting of metal, ceramic, fiberglass, plastic and wood, with a first wash solution comprising water and a terpene to produce a first waste solution;
    (b) rinsing said contacted article from step (a) with water to produce a second waste solution;
    (c) filtering a stream selected from the group consisting of said first waste solution, said second waste solution, and mixtures thereof, to separate water from said terpene;
    (d) wherein at least a portion of rinse water in step (b) is water separated in step (c).

10. The method as set forth in claim 9, wherein said filter stream in step (c) has a terpene concentration of at least about 0.5 vol. %.

11. The method as set forth in claim 9, wherein at least part of said contaminated article is contaminated with a synthetic contaminant having a molecular weight of at least about 300.

12. The method as set forth in claim 9, wherein said filter stream in step (c) has a concentration of contaminants greater than about 0.5 vol. %.

13. The method as set forth in claim 9, wherein said terpene is selected from the group comprising d-limonene, alpha-terpineol, beta-terpineol, alpha-pinene, beta-pinene, alcohols thereof and mixtures thereof.

14. The method as set forth in claim 9, further comprising:
   (e) rinsing the rinsed article from step (b) with water to produce a third waste solution; and
   (f) wherein at least part of said rinse water used in step (b) comprises said third waste solution.

15. A method of cleaning contaminated articles, comprising:
   (a) contacting a contaminated article, such article made of a material selected from the group consisting of metal, ceramic, fiberglass, plastic and wood, with a first wash solution comprising water and a terpene to produce a first waste solution;
   (b) rinsing said contacted article from step (a) with water to produce a second waste solution;
   (c) filtering a stream selected from the group consisting of said first waste solution, said second waste solution, and mixtures thereof, to separate water from said terpene; and
   (d) wherein at least a portion of the terpene in said first wash solution is terpene separated in step (c).

16. The method as set forth in claim 15, wherein said filter stream in step (c) has a terpene concentration of at least about 0.5 vol. %.

17. The method as set forth in claim 15, wherein at least part of said contaminated article is contaminated with a synthetic contaminant having a molecular weight of at least about 300.

18. The method as set forth in claim 15, wherein said filter stream in step (c) has a concentration of contaminants greater than about 0.5 vol. %.

19. The method as set forth in claim 15, wherein said terpene is selected from the group comprising d-limonene, alpha-terpineol, beta-terpineol, alpha-pinene, beta-pinene, alcohols thereof and mixtures thereof.

20. The method as set forth in claim 15, further comprising:
   (e) rinsing the rinsed article from step (b) with water to produce a third waste solution; and
   (f) wherein at least part of said rinse water used in step (b) comprises said third waste solution.

21. A method of cleaning contaminated articles, comprising:
   (a) contacting a contaminated article with a first wash solution comprising water and a terpene to produce a first waste solution;
   (b) rinsing said contaminated article from step (a) with water to produce a second waste solution;
   (c) filtering a stream selected from the group consisting of said first waste solution, said second waste solution, and mixtures thereof with a cross-flow filter having a pore size of from about 50 Å to about 7,500 Å.

22. The method as set forth in claim 21, wherein said filter is made of material selected from the group consisting of ceramic, polypropylene, surface treated polypropylene, and surface treated polyacrylnitrile.

23. The method as set forth in claim 22, wherein said filter is ceramic.

24. The method as set forth in claim 21, wherein said filtered stream in step (c) has a terpene concentration of at least about 0.5 vol. %.

25. The method as set forth in claim 21, wherein at least part of said contaminated article is contaminated with a synthetic contaminant having a molecular weight of at least about 300.

26. The method as set forth in claim 21, wherein said filtered stream in step (c) has a concentration of contaminants greater than about 0.5 vol. %.

27. The method as set forth in claim 21, wherein said terpene is selected from the group comprising d-limonene, alpha-terpineol, beta-terpineol, alpha-pinene, beta-pinene, alcohols thereof and mixtures thereof.

28. The method as set forth in claim 21, further comprising:
   (d) rinsing the rinsed article from step (b) with water to produce a third waste solution; and
   (e) wherein at least part of said rinse water used in step (b) comprises said third waste solution.

* * * * *